United States Patent
Yu et al.

(10) Patent No.: US 9,243,576 B2
(45) Date of Patent: Jan. 26, 2016

(54) SYSTEM AND METHOD FOR CONTROLLING NOX

(75) Inventors: Jun Yu, Suwon-si (KR); Kihoon Nam, Gunpo-si (KR); Kyoungchan Han, Hwaseong-si (KR); KyoungDoug Min, Seoul (KR); Junyong Lee, Seoul (KR); Wonah Park, Seoul (KR)

(73) Assignees: Hyundai Motor Company, Seoul (KR); SNU R&DB Foundation, Seoul (KR)

( * ) Notice: Subject to any disclaimer, the term of this patent is extended or adjusted under 35 U.S.C. 154(b) by 886 days.

(21) Appl. No.: 13/529,975

(22) Filed: Jun. 21, 2012

(65) Prior Publication Data

US 2013/0131967 A1 May 23, 2013

(30) Foreign Application Priority Data

Nov. 22, 2011 (KR) .................... 10-2011-0122438

(51) Int. Cl.
*F02D 41/14* (2006.01)
*F01N 9/00* (2006.01)
*F02D 41/00* (2006.01)
*F01N 3/08* (2006.01)
*F01N 3/20* (2006.01)

(52) U.S. Cl.
CPC ........... *F02D 41/1462* (2013.01); *F01N 9/005* (2013.01); *F02D 41/1465* (2013.01); *F01N 3/0871* (2013.01); *F01N 3/208* (2013.01); *F01N 2430/06* (2013.01); *F01N 2900/1402* (2013.01); *F02D 41/005* (2013.01); *F02D 2041/1433* (2013.01); *F02D 2250/36* (2013.01); *Y02T 10/47* (2013.01)

(58) Field of Classification Search
CPC .................... F02D 41/1462; F02D 41/1465
USPC ............... 123/568.21, 435, 672, 689, 698; 73/104, 105
See application file for complete search history.

(56) References Cited

U.S. PATENT DOCUMENTS

| | | | |
|---|---|---|---|
| 8,140,248 B2* | 3/2012 | Mehendale et al. .......... 701/114 |
| 2008/0149081 A1* | 6/2008 | Allain ....................... 123/568.21 |
| 2008/0201054 A1* | 8/2008 | Grichnik et al. .............. 701/102 |
| 2009/0205617 A1* | 8/2009 | Tonetti et al. ............ 123/568.18 |
| 2010/0083640 A1* | 4/2010 | Wang et al. ..................... 60/286 |
| 2010/0095933 A1 | 4/2010 | Moriya et al. | |
| 2010/0218487 A1* | 9/2010 | Wang et al. ..................... 60/287 |
| 2013/0024089 A1* | 1/2013 | Wang et al. ................... 701/102 |

FOREIGN PATENT DOCUMENTS

| | | |
|---|---|---|
| JP | 2006-274905 A | 10/2006 |
| JP | 2009-209896 A | 9/2009 |
| JP | 2010-106734 A | 5/2010 |

* cited by examiner

*Primary Examiner* — Erick Solis
(74) *Attorney, Agent, or Firm* — Morgan, Lewis & Bockius LLP

(57) ABSTRACT

A system and a method for controlling NOx may include predicting NOx generation amount by using a virtual sensor; comparing the NOx prediction amount with a predetermined NOx target amount; and controlling the NOx generation amount so as for the NOx prediction amount to follow the NOx target amount.

13 Claims, 8 Drawing Sheets

SYSTEM AND METHOD FOR CONTROLLING NOX

CROSS-REFERENCE TO RELATED APPLICATION

The present application claims priority of Korean Patent Application Number 10-2011-0122438 filed Nov. 22, 2011, the entire contents of which application is incorporated herein for all purposes by this reference.

BACKGROUND OF INVENTION

1. Field of Invention

The present invention relates to a system and a method for controlling NOx. More particularly, the present invention relates to a system and a method for controlling NOx that can predict NOx amount generated in an engine of a vehicle without an additional NOx sensor and can control NOx by using the predicted NOx amount.

2. Description of Related Art

As emission regulations for vehicles having an internal combustion engine becomes stricter and stricter, it is required for reducing emission during operation of the internal combustion engine. One method for reducing emission is to reduce emission generated in each cylinder of the internal combustion engine during combustion of an air/fuel mixture.

Another method for reducing emission is to use a post-processing system of an exhaust gas in the internal combustion engine. The post-processing system of the exhaust gas is adapted to convert noxious materials generated at each cylinder during combustion of the air/fuel mixture into harmless materials. For this purpose, catalytic converters are used for converting carbon monoxide, hydrocarbon, and nitrogen oxide into harmless material.

In order to efficiently convert noxious materials by using the catalytic converters of the exhaust gas, technique for controlling the NOx is necessary. In order to control the NOx, it is necessary to precisely predict the NOx amount generated in the engine.

According to conventional arts, devices for analyzing the exhaust gas or sensors for detecting the NOx amount are used so as to predict the NOx amount precisely. If the devices for analyzing the exhaust gas or the sensors for detecting the NOx amount, cost may increase. In addition, compositions in the engine exhaust gas may contaminate the devices for analyzing the exhaust gas or the sensors for detecting the NOx amount and the sensors themselves are out of order.

In order to solve above-mentioned problems, technique for predicting NOx amount is developed. Reliability, however, may be deteriorated according to the technique due to very complicated calculation processes and very simplified assumptions for simplifying the calculation processes.

Since it is hard to obtain precise and reliable NOx amount according to the technique, a method for controlling the NOx based on the predicted NOx amount cannot be relied on.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a system and a method for controlling NOx having advantages of precisely predicting NOx amount by using a combustion pressure and driving variables of an engine without additional devices for analyzing an exhaust gas or sensors for detecting the NOx amount, and of improving reliability of NOx control by using the precisely predicted NOx amount.

Various aspects of the present invention provide for a method for controlling NOx that may include predicting NOx generation amount by using a virtual sensor; comparing the NOx prediction amount with a predetermined NOx target amount; and controlling the NOx generation amount so as for the NOx prediction amount to follow the NOx target amount.

The method may be repeated continuously during running of a vehicle.

The NOx generation amount may be controlled such that a vehicle is controlled to enter a fuel consumption or an output improve mode when the NOx prediction amount is smaller than the NOx target amount, and the vehicle is controlled to enter an exhaust mode when the NOx prediction amount is larger than the NOx target amount.

Control of the NOx generation amount may be performed by controlling at least one of a fuel amount, a fuel injection timing, an EGR rate, and a boost pressure.

The prediction of the NOx generation amount may include: calculating NO generation rate by using a combustion pressure of an engine and driving variables of the engine; obtaining NO generation period by using the combustion pressure of the engine; calculating NO generation amount based on the NO generation rate and the NO generation period; and predicting the NOx generation amount by obtaining $NO_2$ generation amount based on a ratio between NO and $NO_2$ according to the NO generation amount and a driving condition of the engine.

The driving variables of the engine may include at least one of a fuel amount, an engine speed (RPM), an air/fuel ratio (AF), and an EGR information.

The NO generation rate may be calculated as:

$$\frac{d[NO]}{dt} = \frac{A}{T^{\frac{1}{2}}}\exp\left(\frac{B}{T}\right)[O_2]^{\frac{1}{2}}[N_2]$$

wherein $d[NO]/dt$ is the NO generation rate to a time, T is a burned gas temperature, $[O_2]$ is an oxygen concentration in a combustion chamber, $[N_2]$ is nitrogen concentration in the combustion chamber, and A and B are constants.

The NO generation period may be obtained by using an MFB 40-80 region or an MFB 50-90 region.

Various aspects of the present invention provide for a system for controlling NOx that may include a measuring portion adapted to predict NOx generation amount by using a virtual sensor; a determining portion adapted to compare the NOx prediction amount with a predetermined NOx target amount; and a control portion adapted to control the NOx generation amount such that the NOx prediction amount follows the NOx target amount.

The control portion may be adapted to control a vehicle to enter a fuel consumption or an output improve mode when the NOx prediction amount is smaller than the NOx target amount, and to control the vehicle to enter an exhaust mode when the NOx prediction amount is larger than the NOx target amount.

The control portion may control the NOx generation amount by controlling at least one of a fuel amount, a fuel injection timing, an EGR rate, and a boost pressure.

The virtual sensor may be adapted to calculate NO generation rate by using a combustion pressure of an engine and driving variables of the engine, to obtain NO generation period by using the combustion pressure of the engine, to calculate NO generation amount based on the NO generation period, and to predict the NOx generation amount by obtaining $NO_2$ generation amount based on a ratio between NO and $NO_2$ according to the NO generation amount and a driving condition of the engine.

The driving variables of the engine may include at least one of a fuel amount, an engine speed (RPM), an air/fuel ratio (AF), and an EGR information.

The NO generation rate is calculated as:

$$\frac{d[NO]}{dt} = \frac{A}{T^{\frac{1}{2}}} \exp\left(\frac{B}{T}\right)[O_2]^{\frac{1}{2}}[N_2]$$

wherein d[NO]/dt is the NO generation rate to a time, T is a burned gas temperature, $[O_2]$ is an oxygen concentration in a combustion chamber, $[N_2]$ is nitrogen concentration in the combustion chamber, and A and B are constants.

The NO generation period may be obtained by using an MFB 40-80 region or an MFB 50-90 region.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
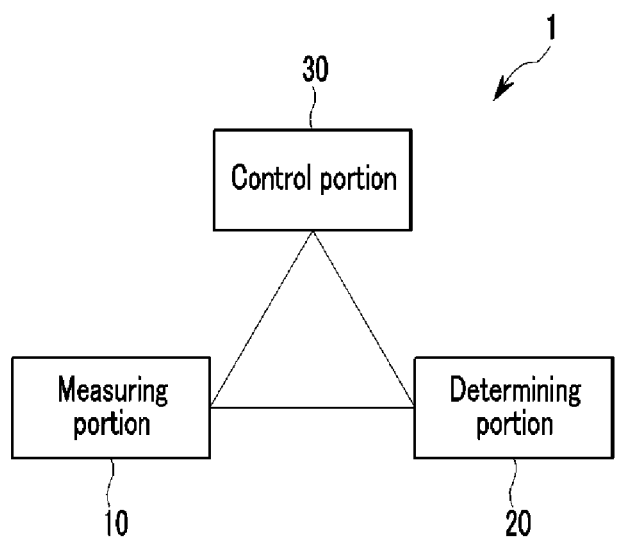
FIG. 1 is a schematic diagram of an exemplary system for controlling NOx according to the present invention.

FIG. 1 is a schematic diagram of a system for controlling NOx according to various embodiments of the present invention.

As shown in FIG. 1, a system 1 for controlling NOx according to various embodiments of the present invention includes a measuring portion 10 for predicting NOx generation amount by using a virtual sensor, a determining portion 20 for comparing the NOx prediction amount with a predetermined NOx target amount, and a control portion 30 for controlling the NOx generation amount so as for the NOx prediction amount to follow the NOx target amount.

The measuring portion 10 is adapted to predict the NOx generation amount. The measuring portion 10, different from conventional arts, is adapted to predict the NOx generation amount by using the virtual sensor without additional sensors for detecting the NOx amount.

Since various embodiments of the present invention predicts the NOx generation amount by using the virtual sensor, compositions contained in the exhaust gas does not contaminate the sensors and the sensors are not out of order.

A method of predicting the NOx generation amount by using the virtual sensor will be described later.

Meanwhile, the determining portion 20 compares the NOx generation amount predicted by the measuring portion 10 with a predetermined NOx target amount in real time. The NOx target amount can be changed according to environmental conditions or driving conditions of the vehicle. Therefore, the NOx target amount can be pre-stored taking into account of the environmental conditions or the driving conditions of the vehicle.

The control portion 30 is adapted to control the NOx generation amount so as for the NOx prediction amount to be the NOx target amount. An ECU (Electric Control Unit) of the vehicle may be the control portion 30.

In various embodiments, the control portion 30 is adapted to control the vehicle to enter a fuel consumption or an output improve mode when the NOx prediction amount is smaller than the NOx target amount, and to control the vehicle to enter an exhaust mode when the NOx prediction amount is larger than the NOx target amount.

When a comparing result of the determining portion 20 indicates that the NOx prediction amount is smaller than the NOx target amount, the NOx generation amount may be increased. Therefore, the control portion 30 controls the vehicle to run at the fuel consumption or the output improve mode, and accordingly the NOx generation amount is increased so as to approach the NOx target amount. The measuring portion 10 detects the NOx generation amount in real time, and the determining portion 20 determines whether the NOx generation amount reaches the NOx target amount continuously. Therefore, the control portion 30 controls a driving mode of the vehicle continuously.

Meanwhile, when the comparing result of the determining portion 20 indicates that the NOx prediction amount is larger than the NOx target amount, the control portion 30 controls the vehicle to run at the exhaust mode so as to reduce the NOx.

In various embodiments, the control portion 30 controls the NOx generation amount by controlling at least one of a fuel amount, a fuel injection timing, an EGR rate, and a boost pressure. As the EGR rate is lowered, emission of the NOx increases as shown in FIG. 2A. On the contrary, as the fuel injection timing is advanced, emission of the NOx increases as shown in FIG. 2B. Since the fuel amount and the boost pressure are related to emission of the NOx, the control portion 30 controls at least one of the fuel amount, the fuel injection timing, the EGR rate, and the boost pressure such that the NOx prediction amount predicted by the measuring portion 10 reaches the NOx target amount.

A method for controlling NOx according to various embodiments of the present invention will hereinafter be described in detail with reference to the accompanying drawings.

Figure 3:
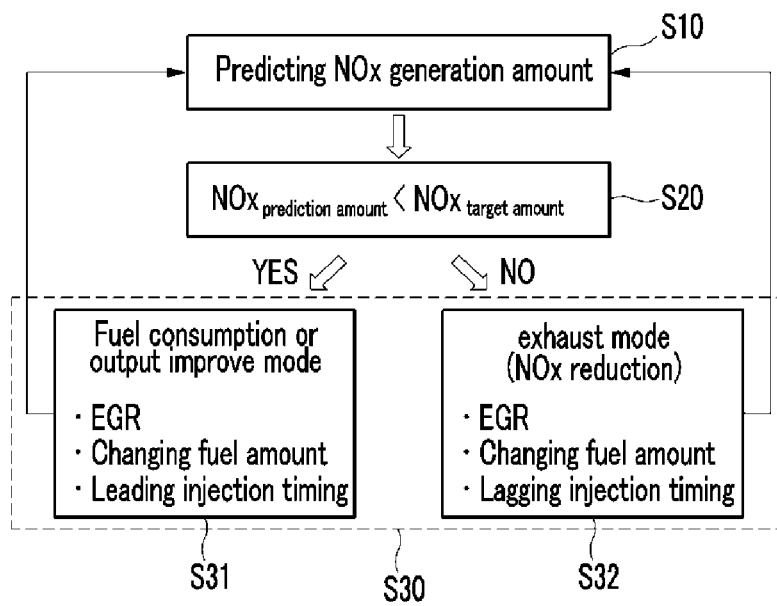
FIG. 3 is a flowchart of an exemplary method for controlling NOx according to the present invention.

As shown in FIG. 3, a method for controlling NOx according to various embodiments of the present invention may include predicting the NOx generation amount by using the virtual sensor at a step S10, comparing the NOx prediction amount with the predetermined NOx target amount at a step S20, and controlling the NOx generation amount so as for the NOx prediction amount to follow the NOx target amount at a step S30.

That is, the method for controlling NOx according to various embodiments of the present invention is adapted to predict the NOx generation amount in real time by using the virtual sensor without having an actual NOx sensor, and to control the predicted NOx generation amount to reach the predetermined NOx target amount.

Firstly, the NOx generation amount is predicted by using the virtual sensor at the step S10.

The step S10 where the NOx generation amount is predicted by using the virtual sensor will be described in detail with reference to the accompanying drawings.

The prediction of the NOx generation amount by using the virtual sensor can be applied to the system for controlling the NOx.

Figure 4:
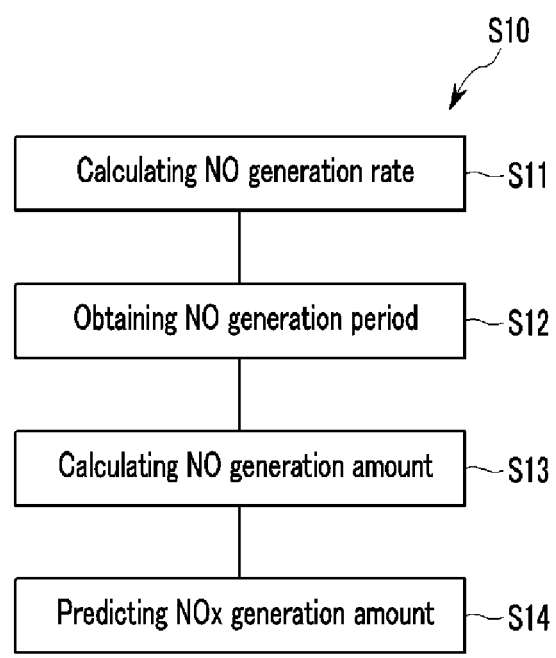
FIG. 4 is an exemplary flowchart of predicting NOx generation amount according to the present invention.
Figure 5:
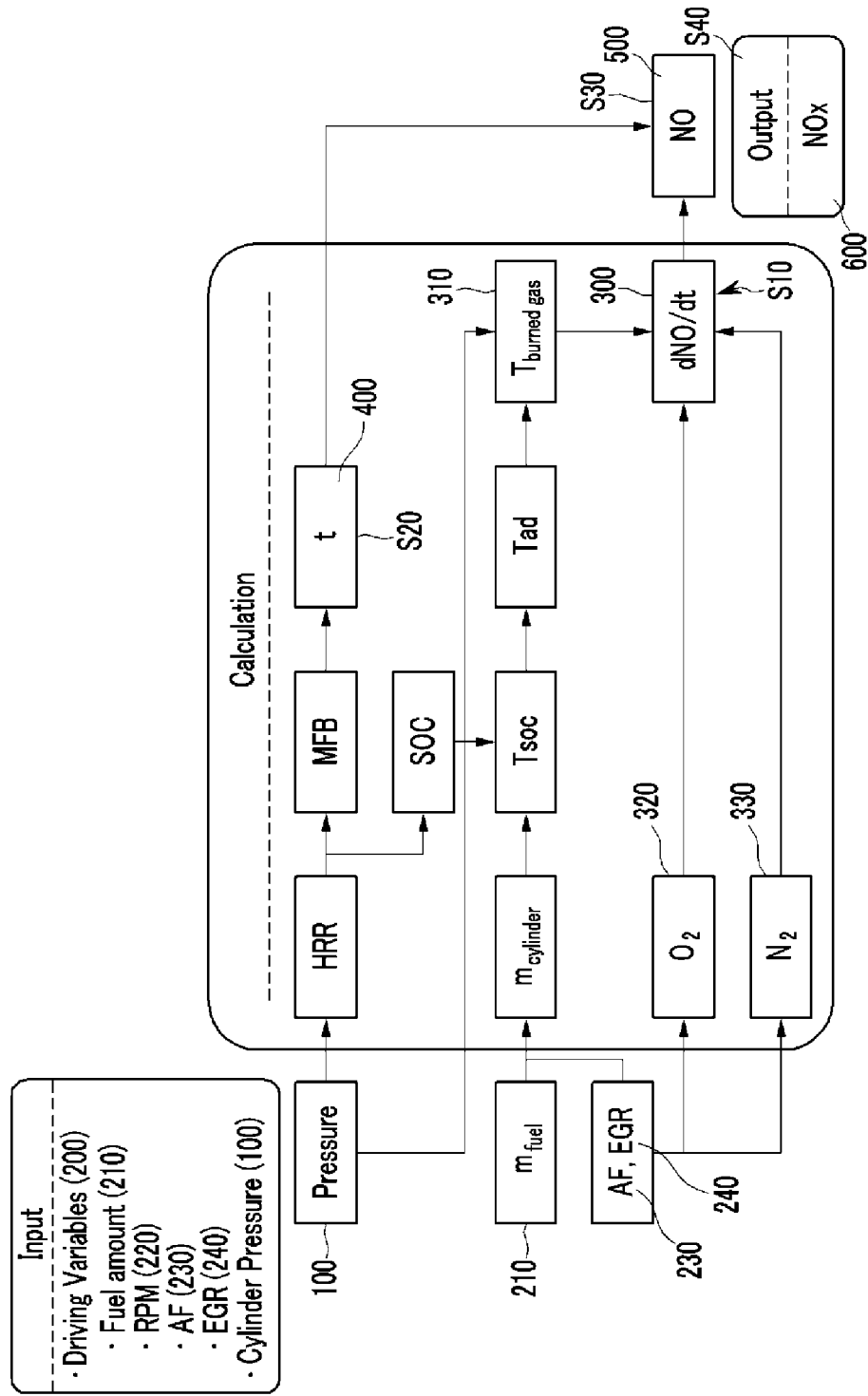
FIG. 5 is an exemplary block diagram of predicting NOx generation amount according to the present invention.

FIG. 4 is a flowchart of predicting NOx generation amount according to various embodiments of the present invention, and FIG. 5 is a block diagram of predicting NOx generation amount according to various embodiments of the present invention.

As shown in FIG. 4 and FIG. 5, the step S10 where the NOx generation amount is predicted according to various embodiments of the present invention includes calculating NO generation rate 300 by using a combustion pressure 100 of the engine and driving variables 200 of the engine at a step S11, obtaining NO generation period 400 by using the combustion pressure 100 of the engine at a step S12, calculating NO generation amount 500 based on the NO generation rate 300 and the NO generation period 400 at a step S13, and predicting the NOx generation amount at a step S14 by obtaining NO2 generation amount based on a ratio between NO and NO$_2$ according to the NO generation amount 500 and the driving condition of the engine.

Firstly, the NO generation amount 300 is calculated by using the combustion pressure 100 of the engine and the driving variables 200 of the engine at the step S11.

The driving variables 200 of the engine include a fuel amount 210 ($m_{fuel}$), an engine speed 220 (RPM), an air/fuel ratio 230 (AF), and an EGR information 240 such as an EGR amount and an EGR rate (EGR_rate). The NO generation rate 300 is calculated based on the driving variables 200 of the engine.

In various embodiments, the NO generation rate 300 is calculated from Equation 1.

$$\frac{d[NO]}{dt} = \frac{A}{T^{\frac{1}{2}}} \exp\left(\frac{B}{T}\right) [O_2]^{\frac{1}{2}} [N_2] \quad \text{Equation 1}$$

In the equation 1, d[NO]/dt is the NO generation rate 300, T is a burned gas temperature 310, [O$_2$] is an oxygen concentration 320 in a combustion chamber, [N$_2$] is a nitrogen concentration 330 in the combustion chamber, and A and B are constants obtained by experiments or analyses. In various embodiments, A may be $6*10^{16}$ and B may be −69090.

Therefore, the burned gas temperature (T) 310, the oxygen concentration [O$_2$] 320, and the nitrogen concentration [N$_2$] 330 in the combustion chamber should be known in order to calculate the NO generation rate 300 (d[NO]/dt).

Hereinafter, processes for obtaining the burned gas temperature (T), the oxygen concentration [O$_2$], and the nitrogen concentration [N$_2$] in the combustion chamber will be described.

The burned gas temperature (T=T$_{burned\ gas}$) 310 in the combustion chamber can be calculated by taking into account of an adiabatic flame temperature (T$_{ad}$) and a temperature rise of the burned gas in the combustion chamber due to pressure rise at combustion.

In various embodiments, the burned gas temperature 310 in the combustion chamber can be calculated from equation 2.

$$T_{flame} = T_{ad} \times \left(\frac{P_{max}}{P_i}\right)^{\frac{k-1}{k}} \quad \text{Equation 2}$$

In the equation 2, T$_{burned\ gas}$ is the burned gas temperature (T) 310, T$_{ad}$ is the adiabatic flame temperature, P$_i$ is a pressure at a start of combustion, P$_{max}$ is a maximum combustion pressure, and k is a specific heat ratio, that is a ratio of Cv (specific heat under constant volume) to Cp (specific heat under constant pressure).

The P$_i$ (the pressure at the start of combustion) and the P$_{max}$ (the maximum combustion pressure) can be detected by a combustion pressure sensor of the engine that detects the combustion pressure 100 of the engine, and information thereon is converted into an electric signal and is transmitted to the control portion such as the ECU (Electric Control Unit) of the vehicle.

In various embodiments, the adiabatic flame temperature (T$_{ad}$) in the equation 2 can be calculated from equation 3.

$$T_{ad}=(5.7401\times[O_2]^2-4.6043\times[O_2]+1.2616)\times T_{SOC}+ \\ (-22072\times[O_2]^2+16718\times[O_2]-302.76) \quad \text{Equation 3:}$$

In the equation 3, T$_{soc}$ is a temperature in the combustion chamber at the start of combustion and [O$_2$] is the oxygen concentration 320 in the combustion chamber.

As shown in FIG. 5, the start of combustion (SOC) is determined from the combustion pressure 100 in the combustion chamber and a heat release rate (HRR), and the temperature (T$_{SOC}$) in the combustion chamber at the start of combustion is obtained by using the determined start of combustion (SOC).

In various embodiments, the temperature (T$_{SOC}$) in the combustion chamber at the start of combustion can be obtained from equation 3-1.

$$T_{SOC}=P_iV/mR \quad \text{Equation 3-1:}$$

Herein, the P$_i$ is pressure at the start of combustion and is detected by the combustion pressure sensor of the engine at the above-determined start of combustion (SOC), and the R is gas constant of ideal gas equation.

In addition, the m represents an amount of a gas mixture in the cylinder and can be obtained from equation 3-2.

$$m=AF\times m_{fuel}/(1-\text{EGR\_rate}) \quad \text{Equation 3-2:}$$

Herein, AF is an air/fuel ratio 230 and $m_{fuel}$ is the fuel amount 210 that can be known from an ECU signal of the vehicle. Both of the AF and the $m_{fuel}$ are input as the driving variables 200 of the engine.

Meanwhile, the V is a volume at the start of combustion and can be calculated from equation 3-3.

$$V/V_c = 1 + 1/2(r_c - 1)[R + 1 - \cos\theta - \sqrt{R^2 - \sin^2\theta}]$$

$$V_c = \pi \times 1/4 \times B^2 \times S$$

$$R = r/a \qquad \text{Equation 3-3:}$$

Herein, $V_c$ is a clearance volume, $r_c$ is a compression ratio, r is a length of a connecting rod, a is a crank offset, B is a cylinder diameter, and S is a stroke of a piston.

Therefore, the temperature ($T_{SOC}$) in the combustion chamber at the start of combustion can be obtained by substituting m and V calculated from equation 3-2 and equation 3-3 into equation 3-1.

Meanwhile, the oxygen concentration [$O_2$] in the combustion chamber should be calculated so as to obtain the adiabatic flame temperature ($T_{ad}$), and this process will hereinafter be described.

If the oxygen concentration [$O_2$] 320 in the combustion chamber is obtained, the adiabatic flame temperature ($T_{ad}$) can be known from equation 3 as shown in FIG. 5, and the burned gas temperature (T=$T_{burned\ gas}$) 310 in the combustion chamber can be also obtained by using the adiabatic flame temperature ($T_{ad}$).

In various embodiments, the oxygen concentration [$O_2$] and the nitrogen concentration [$N_2$] in the combustion chamber shown in equation 1 can be calculated from equation 4.

$$O_{2\_in} = (1 - \text{EGR\_rate}) \times O_{2\_Air}[\text{vol}, \%] + \text{EGR\_rate} \times O_{2\_EGR}[\text{vol}, \%]$$

$$N_{2\_in} = (1 - \text{EGR\_rate}) \times N_{2\_Air}[\text{vol}, \%] + \text{EGR\_rate} \times N_{2\_EGR}[\text{vol}, \%] \qquad \text{Equation 4}$$

In the equation 4, $O_{2\_in}$ and $N_{2\_in}$ are the oxygen concentration [$O_2$] and the nitrogen concentration [$N_2$] in the combustion chamber, the EGR_rate is the EGR rate, $O_{2\_Air}$ [vol, %] and $N_{2\_Air}$ [vol, %] are concentrations of oxygen and nitrogen in an air, and $O_{2\_EGR}$ [vol, %] and $N_{2\_EGR}$ [vol, %] are concentrations of oxygen and nitrogen in an EGR gas.

That is, the oxygen concentration [$O_2$] 320 in the combustion chamber can be obtained based on the oxygen concentration $O_{2\_Air}$ [vol, %] in the intake air and the oxygen concentration $O_{2\_EGR}$ [vol, %] in the EGR gas, and the nitrogen concentration [$N_2$] 330 in the combustion chamber can be obtained based on the nitrogen concentration $N_{2\_Air}$ [vol, %] in the intake air and the nitrogen concentration $N_{2\_EGR}$ [vol, %] in the EGR gas.

The EGR rate (EGR_rate) is a recirculation ratio of the exhaust gas, and can be calculated from EGR gas amount/(EGR gas amount+intake air amount)*100 or from a ratio between a value obtained by subtracting carbon dioxide concentration in the atmosphere from carbon dioxide concentration in an intake pipe and a value obtained by subtracting carbon dioxide concentration in the atmosphere from carbon dioxide concentration in the exhaust gas.

The $O_{2\_Air}$ [vol, %] and the $N_{2\_Air}$ [vol, %] are concentrations of the oxygen and the nitrogen in the intake air and can be replaced by oxygen concentration and nitrogen concentration in the atmosphere.

The $O_{2\_EGR}$ [vol, %] and the $N_{2\_EGR}$ [vol, %] are oxygen concentration and nitrogen concentration in the EGR gas and can be calculated from equation 4-1 to equation 4-3.

$$O_{2\_EGR}[\text{vol}, \%] = O_{2\_EGR}/\text{Total\_Vol}$$

$$N_{2\_EGR}[\text{vol}, \%] = N_{2\_EGR}/\text{Total\_Vol}$$

$$\text{Total\_Vol} = O_{2\_EGR} + N_{2\_EGR} + CO_{2\_EGR} + H_2O_{2\_EGR} \qquad \text{Equation 4-1}$$

$$O_{2\_EGR} = 1 - z$$

$$N_{2\_EGR} = Q$$

$$CO_{2\_EGR} = z \times e$$

$$H_2O_{\_EGR} = 2 \times (1-e) \times z \qquad \text{Equation 4-2:}$$

$$z = AF_{stoi}/AF$$

$$e = 4/(4+y)$$

$$y = H/C\_\text{ratio} \qquad \text{Equation 4-3:}$$

In the equation 4-3, the AF is the air/fuel ratio 230 and represents a ratio of weight of the air to that of the fuel used in combustion. In various embodiments of the present invention, the AF is detected as one of the driving variables 200 of the engine and is input. In addition, the $AF_{stoi}$ is a stoichiometric air/fuel ratio and is determined according to kind of the fuel. The $AF_{stoi}$ is an ideal air/fuel ratio of a corresponding fuel. The y is determined according to kind of the fuel and is defined as a ratio of hydrogen (H) to carbon (C) (y=H/C_ratio) in each molecular formula of the corresponding fuel.

In the equation 4-2, the Q is a component ratio of nitrogen in the EGR gas and is determined according to the fuel. For example, Q may be 3.773 in a case of diesel fuel.

That is, only the air/fuel ratio (AF) 230 is detected and is substituted in equation 4-1 to equation 4-3, and remaining Q, $AF_{stoi}$ and y are determined according to kind of the fuel.

Therefore, the $O_{2\_EGR}$ [vol, %] and the $N_{2\_EGR}$ [vol, %] in equation 4-1 can be calculated from equation 4-3 and equation 4-2, and the oxygen concentration [$O_2$] and the nitrogen concentration [$N_2$] in the combustion chamber can be calculated by substituting the $O_{2\_EGR}$ [vol, %] and the $N_{2\_EGR}$ [vol, %] in equation 4.

As shown in FIG. 5, if the oxygen concentration [$O_2$] 320 in the combustion chamber obtained at the above-mentioned process is substituted in equation 3, the adiabatic flame temperature ($T_{ad}$) can be calculated and the burned gas temperature (T) 310 is calculated from equation 2 based on the $T_{ad}$.

That is, because the burned gas temperature (T) 310, the oxygen concentration [$O_2$] 320, and the nitrogen concentration [$N_2$] 330 can be calculated, the NO generation rate (d[NO]/dt) 300 can also be calculated by substituting these values in equation 1 according to various embodiments of the present invention.

In addition, the NO generation period 400 is obtained by using the combustion pressure of the engine 100 at the step S12.

The NO generation period 400 is obtained by using phenomenon that NO generation is similar to a change of MFB (Mass Fraction Burned). For this purpose, heat release rate (HRR) is obtained from the combustion pressure 100 of the engine, the heat release rate (HRR) is integrated, and the MFB is calculated based on a point at which the heat release rate is maximized, as shown in FIG. 5.

The combustion pressure is analyzed so as to draw a graph (referring to one-point chain line in FIG. 7) for representing the change of the MFB (Mass Fraction Burned), and the NO generation period 400 is determined by using the graph.

Figure 7:
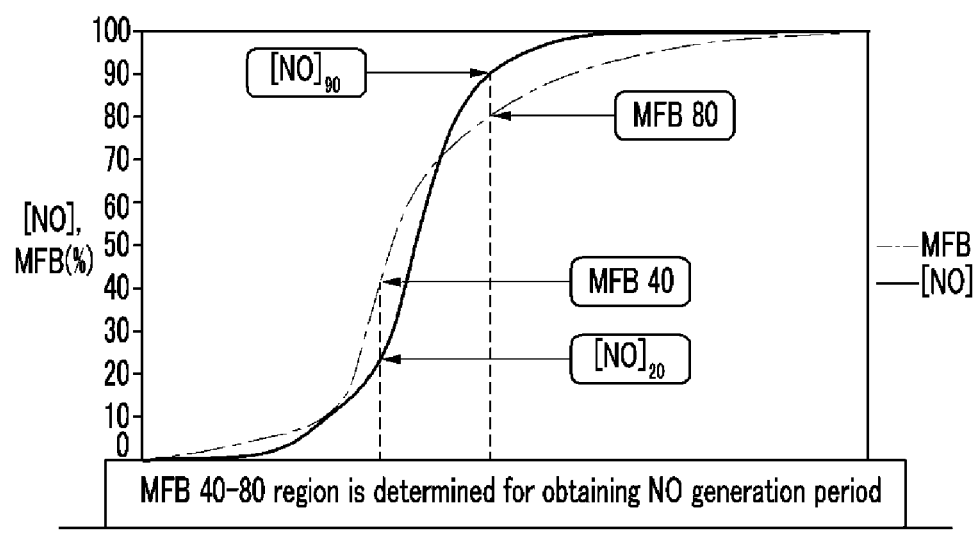
FIG. 7 is an exemplary graph for showing NO generation period according to the present invention.

In various embodiments, the NO generation period 400 may be obtained by using MFB 40-80 region or MFB 50-90 region. If it is assumed that the NO generation period 400 is a region where 20%-90% of the NO is generated, a region of MFB corresponding to the region is the MFB 40-80 region as shown in FIG. 7. Therefore, the NO generation period 400 can be effectively obtained by using the MFB 40-80 region or the MFB 50-90 region. That is, the NO generation period 400 is a duration corresponding to the MFB 40-80 region or the MFB 50-90 region.

Figure 8:
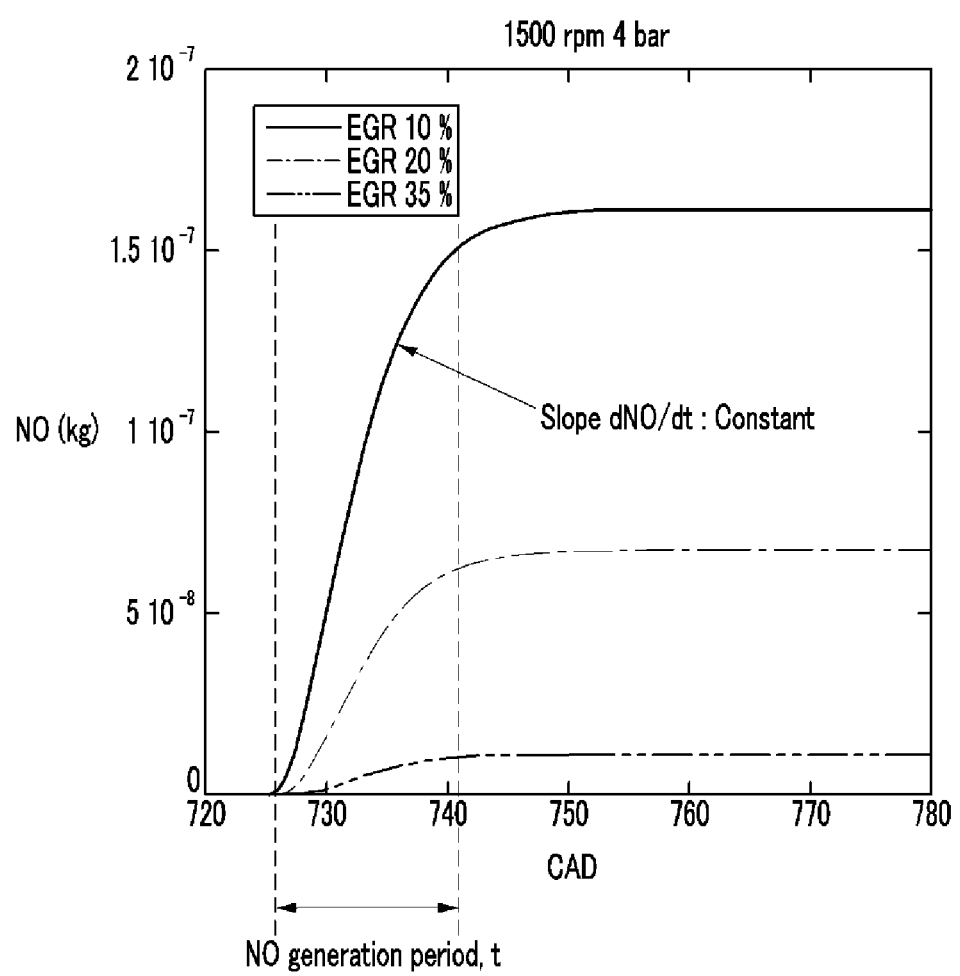
FIG. 8 is an exemplary graph for showing NO generation amount according to the present invention.

If the NO generation period 400 is obtained, the NO generation amount 500 is calculated based on the NO generation rate (d[NO]/dt) 300 obtained from equation 1 and the NO generation period (t) 400 at the step S13, as shown in FIG. 8.

After that, the NOx generation amount 600 is predicted by obtaining NO2 generation amount based on a ratio between NO and $NO_2$ according to the NO generation amount 500 and the driving condition of the engine at the step S14.

In various embodiments, the $NO_2$ generation amount is obtained by means of the ratio between the NO generation amount 500 and the NO2 generation amount according to the driving conditions of the engine from an empirical formula.

In various embodiments, the NOx generation amount 600 can be predicted by adding up the NO generation amount 500 and the NO2 generation amount.

After that, the predicted NOx generation amount is compared with the predetermined NOx target amount at the step S20, as shown in FIG. 3. The NOx target amount can be changed according to the environmental conditions or the driving conditions of the vehicle, and can be pre-defined by taking into account the environmental conditions or the driving conditions of the vehicle.

If the NOx prediction amount differs from the NOx target amount, the NOx generation amount is controlled so as for the NOx prediction amount to follow the NOx target amount at the step S30.

In various embodiments, the vehicle is controlled to enter the fuel consumption or the output improve mode at a step S31 when the NOx prediction amount is smaller than the NOx target amount, and the vehicle is controlled to enter the exhaust mode at a step S32 when the NOx prediction amount is larger than the NOx target amount, as shown in FIG. 3.

As known from equation 1, if the burned gas temperature (T), the oxygen concentration [$O_2$], and the nitrogen concentration [$N_2$] are controlled, the NO generation rate can be controlled and thus the NOx generation amount can be also controlled.

Figure 6:
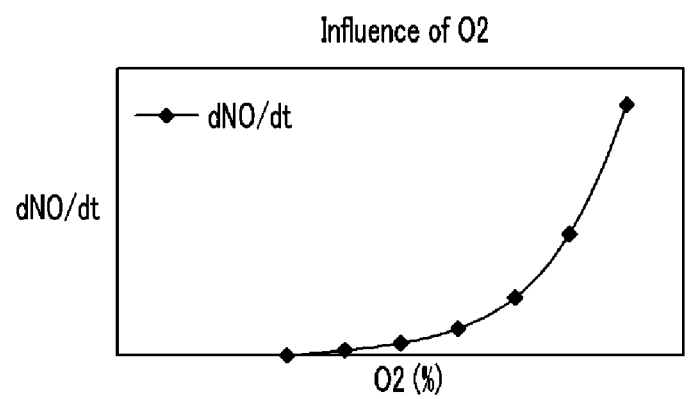
FIG. 6 is a graph for showing relations between oxygen concentration, nitrogen concentration or burned gas temperature and NO generation rate.
Figure 6:
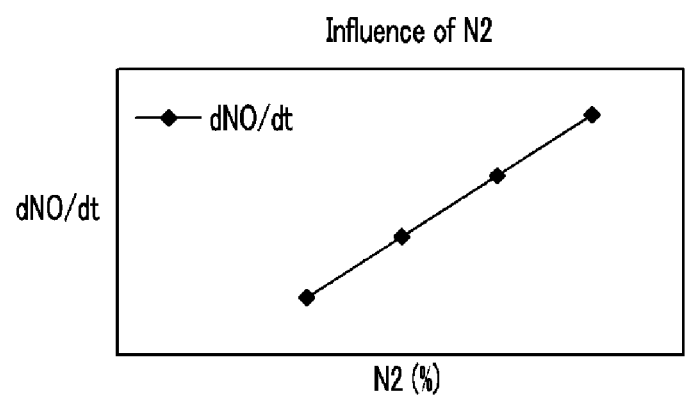
Figure 6:
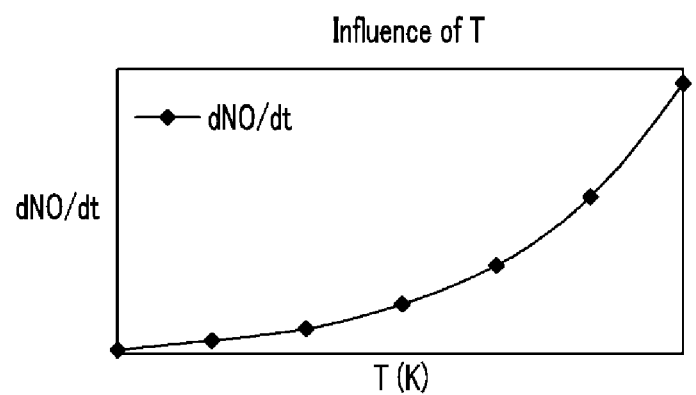

Particularly, the oxygen concentration [$O_2$] and the burned gas temperature (T) have larger influence on the NOx generation amount than the nitrogen concentration [$N_2$] does, as shown in FIG. 6.

In various embodiments, therefore, the NOx generation amount may be controlled by changing the oxygen concentration [$O_2$] and the burned gas temperature (T). For this purpose, at least one of the fuel amount, the fuel injection timing, the EGR rate, and the boost pressure of the vehicle may be controlled. Generally, the burned gas temperature (T) is determined according to the oxygen concentration [$O_2$], the fuel injection amount, and the fuel injection timing, and the oxygen concentration [$O_2$] is determined according to the EGR rate and the boost pressure.

Figure 2:
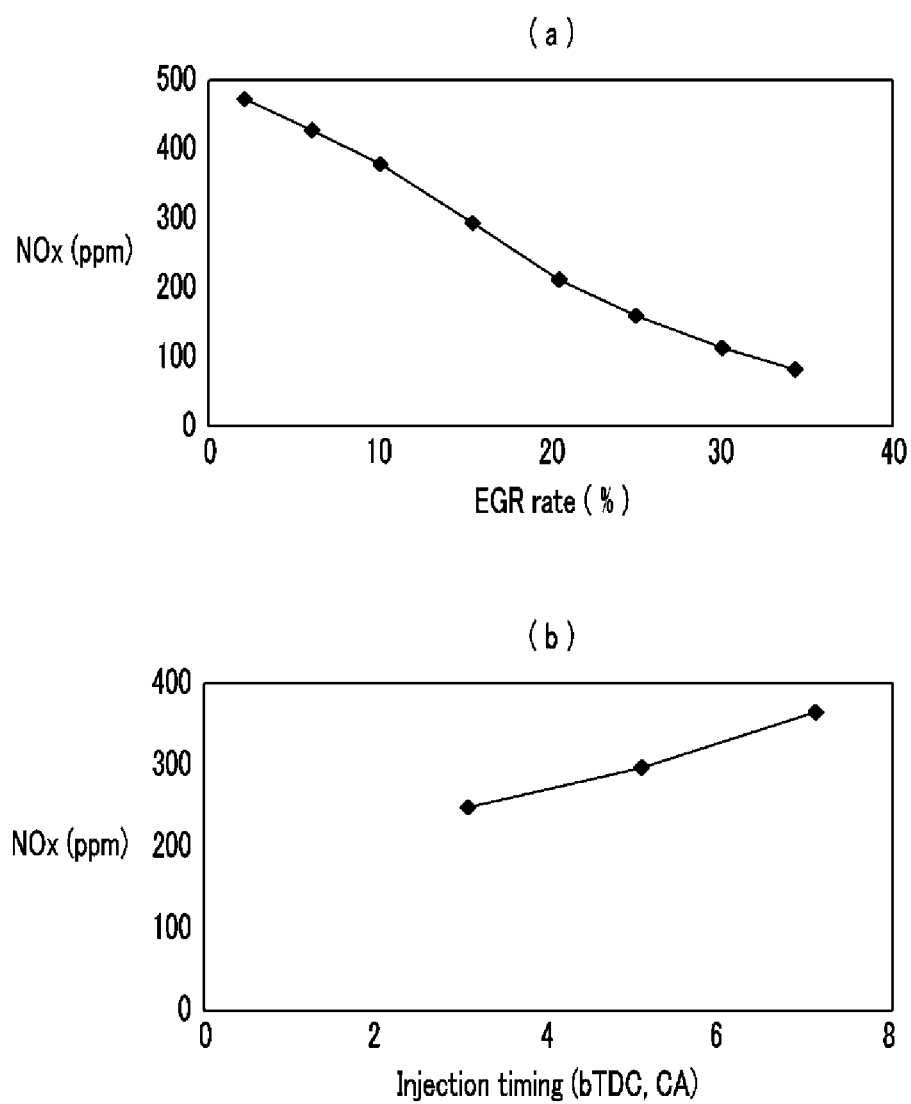
FIG. 2 is a graph for showing relations between EGR rate or injection timing and NOx generation amount.

For example, the relationship between the EGR rate or the fuel injection timing and the NOx generation amount is illustrated in FIG. 2. The control portion such as the ECU of the vehicle can control the NOx generation amount by controlling the fuel amount, the fuel injection timing, the EGR rate, and the boost pressure of the vehicle taking into account this relationship.

Meanwhile, the method for controlling the NOx according to various embodiments of the present invention can be repeated continuously during the vehicle runs.

As described above, a system and a method for controlling NOx according to various embodiments of the present invention can predict NOx amount generated in combustion by using a few variables without complex calculation processes and assumptions. In addition, the NOx can be predicted in real time due to shortened calculation period. Because NOx target amount is set according to a driving condition taking into account of the predicted NOx generation amount, NOx exhaust may be reduced and emission performance may be improved. In addition, technique for predicting NOx generation amount by using a virtual sensor can be applied to post-processing devices for NOx such as an LNT or an SCR.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling nitrogen oxide (NOx), comprising:
   predicting a NOx generation amount using a virtual sensor;
   comparing the predicted NOx generation amount with a predetermined NOx target amount; and
   controlling NOx generation so that the predicted NOx generation amount follows the NOx target amount,
   wherein said predicting the NOx generation amount comprises:
   calculating NO generation rate by using a combustion pressure of an engine and driving variables of the engine;
   obtaining NO generation period by using the combustion pressure of the engine;
   calculating NO generation amount based on the NO generation rate and the NO generation period; and
   predicting the NOx generation amount by obtaining $NO_2$ generation amount based on a ratio between NO and $NO_2$ according to the NO generation amount and a driving condition of the engine.

2. The method of claim 1 being repeated continuously during running of a vehicle.

3. The method of claim 1, wherein the NOx generation is controlled such that a vehicle enters a fuel consumption mode or an output improve mode when the predicted NOx generation amount is smaller than the NOx target amount, and the vehicle enters an exhaust mode when the predicted NOx generation amount is larger than the NOx target amount.

4. The method of claim 1, wherein control of the NOx generation amount is performed by controlling at least one of a fuel amount, a fuel injection timing, an EGR rate, and a boost pressure.

5. The method of claim 1, wherein the driving variables of the engine include at least one of a fuel amount, an engine speed (RPM), an air/fuel ratio (AF), and an EGR information.

6. The method of claim 5, wherein the NO generation rate is calculated from:

$$\frac{d[NO]}{dt} = \frac{A}{T^{\frac{1}{2}}}\exp\left(\frac{B}{T}\right)[O_2]^{\frac{1}{2}}[N_2],$$

wherein the d[NO]/dt is the NO generation rate to a time, the T is a burned gas temperature, the $[O_2]$ is an oxygen concentration in a combustion chamber, the $[N_2]$ is nitrogen concentration in the combustion chamber, and the A and the B are constants.

7. The method of claim 5, wherein the NO generation period is obtained by using an MFB 40-80 region or an MFB 50-90 region.

8. A system for controlling nitrogen oxide (NOx), comprising:
 a measuring portion for predicting a NOx generation amount using a virtual sensor;
 a determining portion for comparing the predicted NOx generation amount with a predetermined NOx target amount; and
 a control portion for controlling the predicted NOx generation amount to follow the NOx target amount,
 wherein the virtual sensor is adapted to calculate NO generation rate by using a combustion pressure of an engine and driving variables of the engine, to obtain NO generation period by using the combustion pressure of the engine, to calculate NO generation amount based on the NO generation period, and to predict the NOx generation amount by obtaining $NO_2$ generation amount based on a ratio between NO and $NO_2$ according to the NO generation amount and a driving condition of the engine.

9. The system of claim 8, wherein the control portion is adapted to control a vehicle to enter a fuel consumption or an output improve mode when the predicted NOx generation amount is smaller than the NOx target amount, and to control the vehicle to enter an exhaust mode when the predicted NOx generation amount is larger than the NOx target amount.

10. The system of claim 8, wherein the control portion controls the NOx generation amount by controlling at least one of a fuel amount, a fuel injection timing, an EGR rate, and a boost pressure.

11. The system of claim 8, wherein the driving variables of the engine includes at least one of a fuel amount, an engine speed (RPM), an air/fuel ratio (AF), and an EGR information.

12. The system of claim 11, wherein the NO generation rate is calculated from:

$$\frac{d[NO]}{dt} = \frac{A}{T^{\frac{1}{2}}}\exp\left(\frac{B}{T}\right)[O_2]^{\frac{1}{2}}[N_2],$$

wherein the d[NO]/dt is the NO generation rate to a time, the T is a burned gas temperature, the $[O_2]$ is an oxygen concentration in a combustion chamber, the $[N_2]$ is nitrogen concentration in the combustion chamber, and the A and the B are constants.

13. The system of claim 11, wherein the NO generation period is obtained by using an MFB 40-80 region or an MFB 50-90 region.

* * * * *